June 20, 1961 J. L. DE CANNIÈRE ET AL 2,989,202
SIDE-LOADING STACKING TRUCK
Filed May 6, 1957 4 Sheets-Sheet 1

INVENTORS
JEAN LOUIS DE CANNIÈRE
ISIDOOR MARIE RILLAERTS
BY
ATTORNEYS

June 20, 1961  J. L. DE CANNIÈRE ET AL  2,989,202
SIDE-LOADING STACKING TRUCK
Filed May 6, 1957  4 Sheets-Sheet 2

INVENTORS
JEAN LOUIS DE CANNIÈRE
ISIDOOR MARIE RILLAERTS

ATTORNEYS

June 20, 1961 J. L. DE CANNIÈRE ET AL 2,989,202
SIDE-LOADING STACKING TRUCK

Filed May 6, 1957 4 Sheets-Sheet 3

INVENTORS
JEAN LOUIS DE CANNIÈRE
ISIDOOR MARIE RILLAERTS
BY
ATTORNEYS

June 20, 1961  J. L. DE CANNIÈRE ET AL  2,989,202
SIDE-LOADING STACKING TRUCK

Filed May 6, 1957  4 Sheets-Sheet 4

INVENTORS
JEAN LOUIS DE CANNIÈRE
ISIDOOR MARIE RILLAERTS

ATTORNEYS

United States Patent Office 2,989,202
Patented June 20, 1961

2,989,202
SIDE-LOADING STACKING TRUCK
Jean Louis de Cannière and Isidoor Marie Rillaerts, Mortsel-Antwerp, Belgium, assignors to Gevaert Photo-Producten N.V., Mortsel, Belgium, a Belgian company
Filed May 6, 1957, Ser. No. 657,360
Claims priority, application Belgium May 9, 1956
4 Claims. (Cl. 214—670)

The present invention relates to small powered trucks for transporting and for stacking and storing piece goods in racks, particularly goods of great weight, such as paper rolls of large width, calender rolls, bars, etc.

Besides the constructional installations, such as roll-bridges and monorails which consumed considerable space, it is also known to use for such transport small electro- or motortrucks with a fork in front whereupon the load is placed overhangingly. Such small trucks can travel forwards and backwards and turn with their load, lift up said load to the desired place and, if necessary, stack it on racks or on stocks in the store rooms. The known small trucks require rather wide aisles since they must be able to swerve with the load into the intersecting side aisles. These known trucks are further heavily built since they must serve as counter-weight means for the overhanging load. Therefore, this load cannot be lifted substantially out of the wheel base without the risk of upsetting the truck.

The known fork lift transporters for sideward stacking are rather wide since one side is built as a counter-weight means. Under such circumstances, they can only stack at one side and must leave the aisle and turn before filling the second stacking side. The wide aisles, moreover, have the great disadvantage of occupying up to 50% of the ground area of the store rooms.

It is an object of the present invention to convey the load in perfect stable equilibrium in two or more horizontal directions and in the vertical or stacking direction. Thus, it becomes possible to construct the truck frame quite narrow and to deposite or to stack the load at will in front, on the left or on the right side of the truck.

The side-loading stacking truck according to the present invention is characterized in that the projection of the centre of gravity of the load at any time during the transporting and stacking or loading and unloading falls within the wheel base of the truck or of a secondary truck carrying the load.

The present inventive idea is put into practice in such a way that the following advantages are obtained.

(1) The side-loading stacking truck according to the present invention can be combined with the tractors for use in confined spaces such as presently used.

(2) Whatever may be the direction of the motion, the apparatus remains perfectly stable by the fact that the load is always within three or four points of support and in this way does not need any counter-weight.

(3) By the fact that the side-loading stacking truck needs no counter-weight and does not swerve any longer for depositing the loads, the aisles of the stacking places can be reduced to a minimum width.

(4) The useful height of stacking practically extends from a few centimeters from the ground up to the ceiling, if necessary.

(5) The movements and positions of the truck can, if necessary, be controlled by the use of rails, one or more feelers, contacts or control points on the truck, which cooperate with stationary elements of the stacking place, in order to accurately place the truck in respect of the racks.

The side-loading stacking truck according to the present invention allows a load to travel according to the three space dimensions, namely:

(1) forwards and backwards by motion of the tractor to which the side-loading stacking truck is connected, (2) in vertical direction in order to stack the load, (3) in direction(s) perpendicular to the first direction, whereby the load can be shifted sidewards into the racks on both sides of the aisle.

In all these movements, the load remains perfectly stable since the projection of the centre of gravity falls within a horizontal plane limited by three or four points of support (e.g. wheels).

The present invention is hereinafter described as an example and is illustrated by the accompanying drawings wherein.

Figure 1:
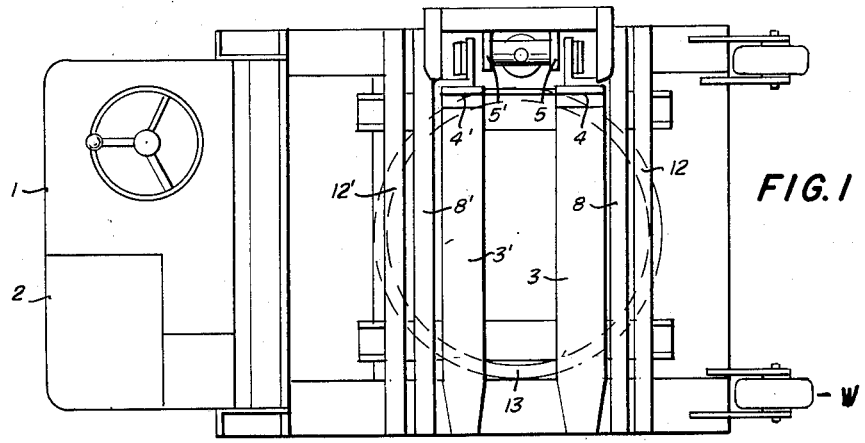
FIG. 1 is a plane view of a side-loading stacking truck according to the invention.
Figure 2:
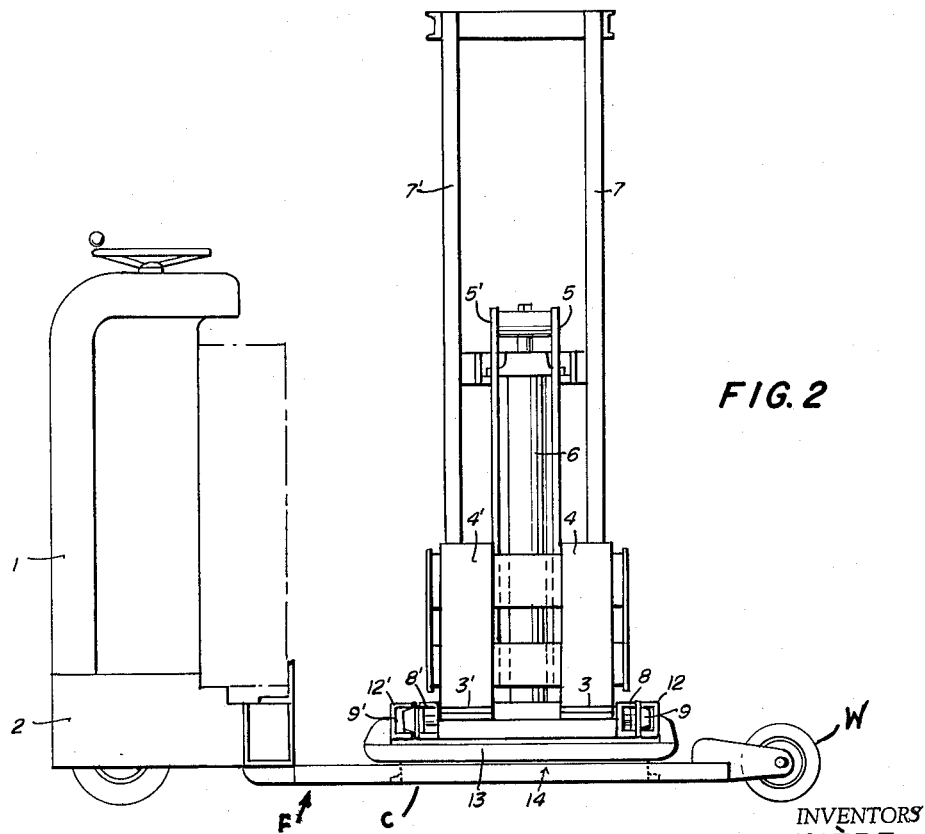
FIG. 2 is a side elevational view of this truck.
Figure 4:
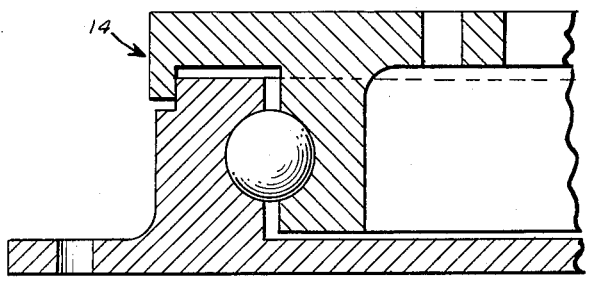
FIG. 4 is a detail of the ball-bearing of the lifting device.
Figure 6:
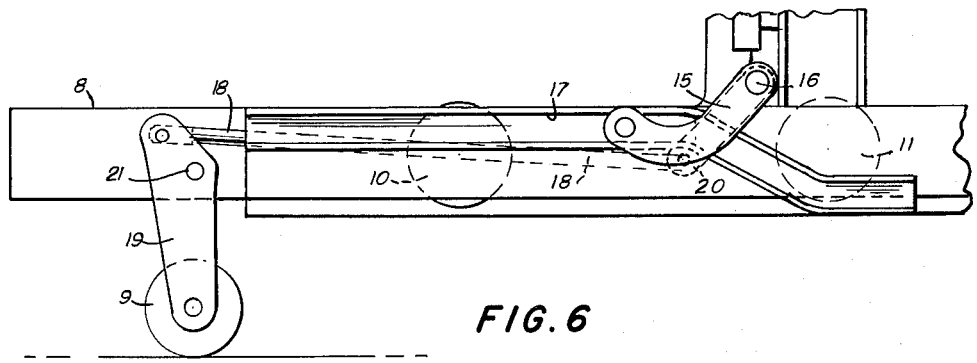
Figure 5:
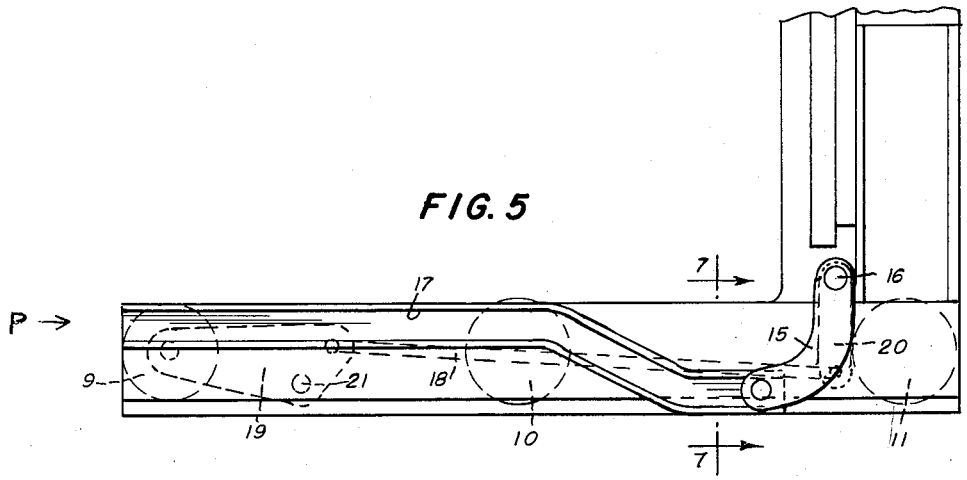
Figure 3:
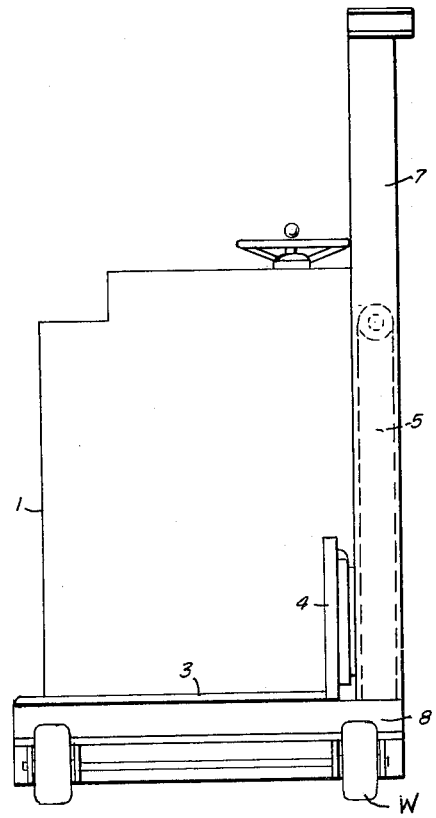
FIG. 3 is a front view of this truck.
Figure 7:
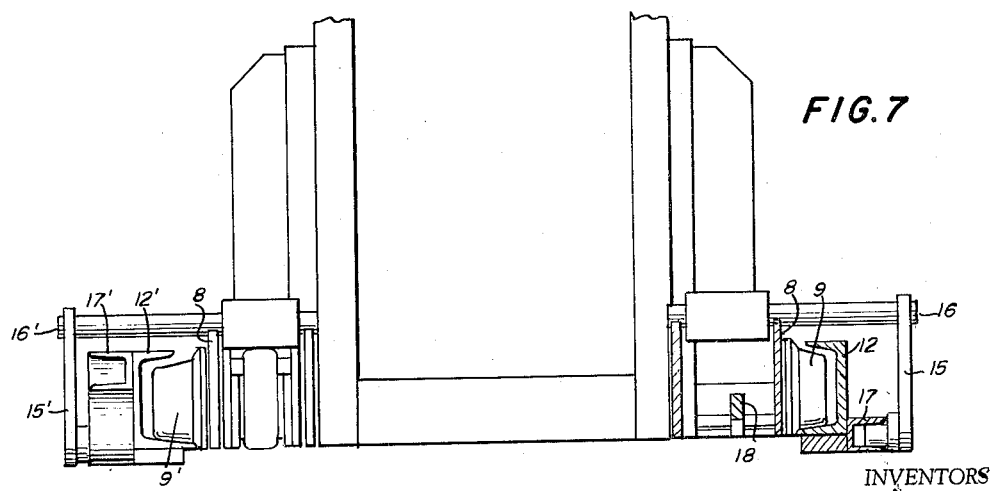
Figure 8:
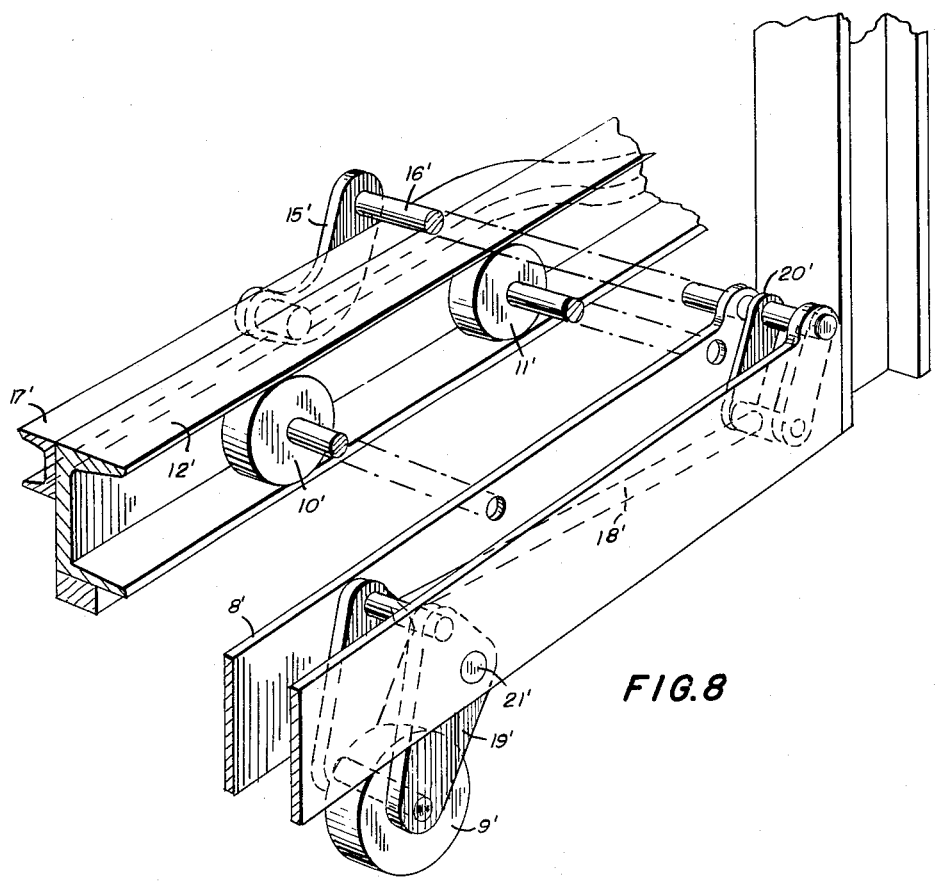

FIG. 5 is a detail of the drawing-out mechanism of the lifting device in closed position, FIG. 6 is a detail of the drawing-out mechanism of the lifting device in opened position, FIG. 7 is on the left side a view according to P (FIG. 5) of the drawing-out mechanism and on the right side a cross section according to 5—5 of FIG. 5, and, FIG. 8 is a fragmental, exploded view of one of the sides of the sliding base.

The truck includes a frame F having a central portion C close to the surface on which the truck is adapted to move, wheels W, driving mechanism 1 and a driver seat 2. The driving mechanism not only controls the truck, but also the lifting, turning and drawing out means by known hydraulic transmissions (not shown). The lifting means proper comprises a fork 3 having a back 4. The fork 3 and back 4 are raised and lowered by cables 5 and a hydraulic press 6 along a vertical frame 7 which serves as a guide and support means for the lifting means.

The vertical frame 7 is mounted on a U-shaped frame or base 8, 8', which frame or base may move horizontally with respect to the truck as well as to the right and forwards. As will later be more fully described, the foregoing arrangement constitutes an essential characteristic of the invention.

Rotatably supported on each leg of the U-shaped frame or base, 8, 8' are three pairs of spaced apart wheels 9—9', 10—10', and 11—11'. The wheel pairs 10—10' and 11—11' roll between the flanges of guide channels or girders 12, 12' arrangel in substantial parallelism to the legs of the U-shaped base. The guide channels 12, 12' are carried by a turntable 13 rotatably mounted on the central portion C of the frame by means of a ball bearing assembly 14. Hence, it will be appreciated that the fork 3 can be turned to different directions mainly to the left and to the right to fill the racks on both sides of the isle from one position of the truck.

In FIGURE 5, there is illustrated the position of the pairs of wheels in the rest position of the truck, whereas in FIGURE 6 the parts are shown in their positions when the U-shaped base 8, 8' has been outwardly respecting the guide channels 12, 12'. To allow such operation of the assembly, it will be noted that each of the forward wheels 9, 9' is supported by a bracket 19 which is pivoted to a leg of the base 8 as at 21 to allow swinging movement of the bracket and wheel. Cam tracks 17—17' are provided on the sides of the guide channels 12—12', and levers 15—15' engage their free ends in these tracks. The free ends are tilted upwardly by the tracks, thus rotating shafts 16—16', as the lifting means and base 8—8' partly move off of the truck. The rotation of shaft 16' also turns lever 20 through a certain angle, and this lever pushes push-pull rod 18' which is attached to bracket 19' of the wheel 9'. The movement of the rod 18' lowers the wheel 9' to the ground, and locks the same during lateral movement of the lifting means, and the load is effectively supported on the ground by wheels 9—9', so that the center of gravity of the load always remains within the compass of the truck wheels, per se, and the temporary supporting wheels 9—9'.

When the fork means is drawn back to its position on the center of the truck frame, the above-described components function in reverse order, and the wheel 9' is at a certain stage lifted from the ground, and held in inoperative position during further movement of the truck along the aisle, or during the pivoting of the lifting means about a vertical axis by the turntable 13.

This rotation of the lifting means on the truck allows the fork means to be brought forwardly to the right or left side of the truck, or to the side opposite the driver's seat. It will be appreciated, therefore, that the wheel 9—9' are supported on the surface, and the projection of the center of gravity of the rod and the lifting means always falls between the wheels 9, 9' and 11, 11' so that the truck is in perfect equilibrium and does not require a counterweight in the form of batteries or motors, which in known trucks are mounted on one side while the load moves to the opposite side for stacking.

From the above description, it can be seen that the outward movement of the forks will cause no upsetting of the assembly by virtue of the wheels 9, 9' which automatically move to the surface-engaging position, upon outward movement of the base 8, 8', thereby overcoming the problems which have heretofore existed in the art.

We claim:

1. An industrial stacking truck comprising a first frame having a central portion close to the rolling level, wheels mounted at the ends of the first frame for supporting the first frame for rolling movement, two guide channels mounted in fixed relation on the first frame and extending transversely to the longitudinal axis of the truck, a second frame supported by and capable of movement between said two guide channels, a pair of spaced supporting uprights, means mounting said supporting uprights on said second frame, a lifting fork assembly guided by said supporting uprights, means for raising and lowering said lifting fork assembly relative to said supporting uprights, a bracket pivotally connected to each end of said second frame, a wheel rotatably supported by each bracket, movement transmitting means connected to each bracket for moving said brackets about their pivots to the second frame, and complemental cam means associated with said guide channels and second frame operably connected to the movement transmitting means so that when said second frame, supporting uprights and lifting fork assembly are partially extended off said guide channels, the movement transmitting means moves said brackets downwardly about their pivots for lowering the wheels whereby the center of gravity of the load always falls within the compass of the bracket mounted wheels resting on the rolling level and the wheels of the first frame.

2. An industrial stacking truck as claimed in claim 1, further including a turntable mounted on the central portion of the first frame and carrying said guide channels, second frame, supporting uprights and lifting fork assembly and means for turning the turntable to the desired positions, namely, a forward position and two transverse positions at right angles to the truck.

3. An industrial stacking truck comprising a first frame having a central portion close to the rolling level, wheels mounted at the ends of the first frame for supporting the first frame for rolling movement, two guide channels mounted in fixed relation on the first frame and extending transversely to the longitudinal axis of the truck, a second frame supported by and capable of movement between said two guide channels, a pair of spaced supporting uprights, means mounting said supporting uprights on said second frame, a lifting fork assembly guided by said supporting uprights, means for raising and lowering said lifting fork assembly relative to said supporting uprights, a bracket pivotally connected to each end of said second frame, a wheel rotatably supported by each bracket, a cam track on each guide channel, lever means mounted for movement in each track, a lever pivoted to each end of said second frame opposite said brackets, means connecting said levers to said lever means, and linkage means interconnecting said levers and brackets so that when said second frame, supporting uprights and lifting fork assembly are partially extended off said guide channels, the lever means are moved by the cam tracks thereby simultaneously swinging said levers about their pivots for displacing said linkage means for moving said brackets downwardly about their pivots for lowering the wheels whereby the center of gravity of the load always falls within the compass of the bracket mounted wheels resting on the rolling level and the wheels of the first frame.

4. A stacking industrial truck as claimed in claim 1, in which said second frame is supported by and rolls on a plurality of wheels movable along said guide channels.

References Cited in the file of this patent

UNITED STATES PATENTS

| | | |
|---|---|---|
| 2,366,378 | Barrett | Jan. 2, 1945 |
| 2,591,544 | Hegarty | Apr. 1, 1952 |
| 2,667,985 | Woughter | Feb. 2, 1954 |
| 2,720,993 | Lull | Oct. 18, 1955 |
| 2,773,614 | Edwards et al. | Dec. 11, 1956 |
| 2,792,956 | Bastie | May 21, 1957 |